United States Patent [19]

Saito

[11] 4,308,890
[45] Jan. 5, 1982

[54] ELECTROMAGNETIC VALVE FOR FLUID FLOW CONTROL

[75] Inventor: Masaaki Saito, Yokosuka, Japan

[73] Assignee: Nissan Motor Co., Ltd., Japan

[21] Appl. No.: 126,987

[22] Filed: Mar. 3, 1980

[30] Foreign Application Priority Data

Mar. 8, 1979 [JP] Japan .............................. 54-29434[U]

[51] Int. Cl.³ ............................................. F16K 31/06
[52] U.S. Cl. .................................... 137/495; 251/129; 251/141
[58] Field of Search ................. 251/129, 141; 137/495

[56] References Cited

U.S. PATENT DOCUMENTS

| 3,712,581 | 1/1973 | Parlow | 251/141 X |
| 3,721,390 | 3/1973 | Jackson | 239/585 |
| 3,731,880 | 5/1973 | Williams | 251/141 X |
| 3,762,683 | 10/1973 | Sangl | 251/141 X |

FOREIGN PATENT DOCUMENTS

| 2300458 | 7/1973 | Fed. Rep. of Germany . |
| 51-16563 | 5/1976 | Japan . |
| 53-25889 | 7/1978 | Japan . |

Primary Examiner—Arnold Rosenthal
Attorney, Agent, or Firm—Lane, Aitken, Kice & Kananen

[57] ABSTRACT

A fuel injector valve for use in an internal combustion engine has a spherical valve member which is movable to be biased onto a valve seat by pressure differential between upstream and downstream sides of the valve member. A pressure responsive element is disposed within the electromagnetic valve and located opposite to the valve member in order to bias the valve member against the valve seat to close a fuel outlet when fuel pressure prevailing upstream of the valve member is lower than a predetermined level.

5 Claims, 2 Drawing Figures

U.S. Patent
Jan. 5, 1982
4,308,890
FIG.1
FIG.2
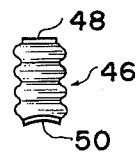
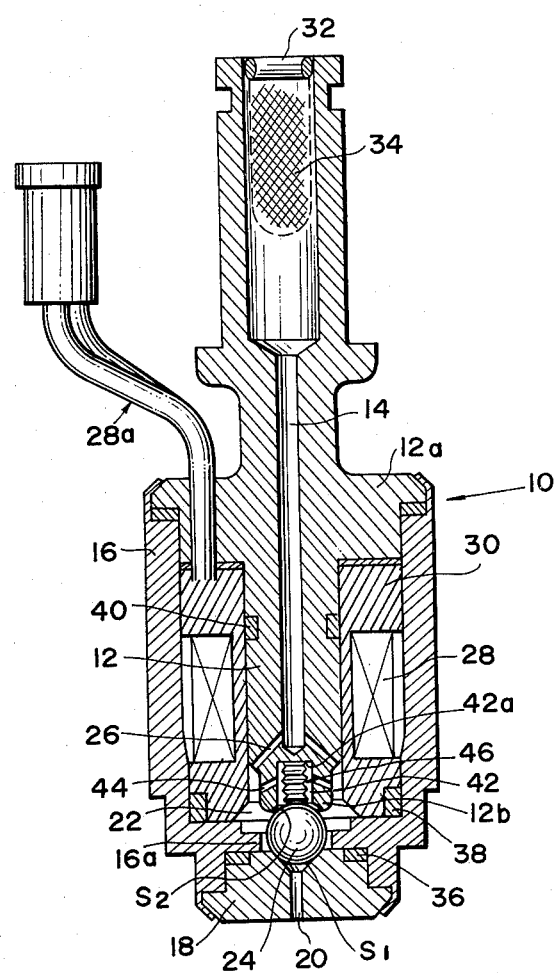

ELECTROMAGNETIC VALVE FOR FLUID FLOW CONTROL

BACKGROUND OF THE INVENTION

This invention relates in general to an electromagnetic valve for controlling fluid flow, and more particularly a fuel injector valve used in an internal combustion engine.

In a usual electromagnetic valve for fluid flow control, a movable valve member is biased by a spring in the direction to perform valve closing, so that the valve member is biased toward a valve seat by the force of the spring to maintain the valve closing state when electric current is not passed through an electromagnetic coil. Such an electromagnetic valve has encountered the following problems: the response of valve opening is not good since the valve member is always biased by the spring. Additionally, the spring itself also vibrates during operation and accordingly it is impossible to obtain uniformity in fluid flow characteristics.

In order to solve these problems, a new type of electromagnetic valve has been proposed, in which a valve member is biased onto a valve seat to perform valve closing, without using a spring, by the action of pressure differential between the upstream and downstream sides of the valve member.

However, with this electromagnetic valve arranged to perform its closing action by only the pressure differential, various disadvantages have arisen. For example, where the electromagnetic valve is a fuel injector valve and it is disposed lateral relative to the engine, when the fuel pressure within the valve lowers and a biasing force to the valve member is decreased, the valve member is moved downward to separate from a valve seat by the action of gravity and accordingly the fuel within the electromagnetic valve is liable to leak through a clearance formed between the valve member and the valve seat. As such, during engine stoppage in which the fuel pressure within the electromagnetic valve decreases, fuel staying in a fuel piping system leaks out of the electromagnetic valve and into an intake conduit into which the fuel injector valve projects to inject fuel, the intake conduit leading to the engine. As a result, the air-fuel mixture supplied to the engine is liable to become too rich to re-start the engine, which renders the re-starting of the engine difficult.

SUMMARY OF THE INVENTION

According to the present invention, in an electromagnetic valve of the type wherein the closing action of a valve member is performed by the pressure differential between upstream and downstream sides of the valve member, a pressure responsive member is disposed within the electromagnetic valve in order to provide a biasing force to the valve member in the direction to perform the closing action of the valve member, in response to pressure prevailing upstream of the valve member.

A main object of the present invention is to provide an improved electromagnetic valve for controlling fluid flow, which can perform a precise fluid flow control without degrading the operation characteristics and the response of the electromagnetic valve, overcoming the drawbacks encountered in conventional similar electromagnetic valves.

Another object of the present invention is to provide an improved electromagnetic valve for controlling fluid flow, in which fluid leakage is not liable to occur through a clearance between a valve member and a valve seat even if the fluid pressure within the electromagnetic valve is lowered by accidents such as fuel leakage in a piping system connecting to the electromagnetic valve.

A further object of the present invention is to provide an improved fuel injector valve for use in an internal combustion engine, by which re-starting of the engine becomes easy since an air-fuel mixture is prevented from becoming too rich to re-start the engine.

A still further object of the present invention is to provide an improved fuel injector valve for use in an internal combustion engine, which improves the freedom in the selection of the installation direction of the electromagnetic valve relative to the engine, exhibiting significant advantages in practical use.

Other objects, features and advantages of the improved electromagnetic valve according to the present invention will become more apparent from the following description taken in conjunction with the accompanying drawings.

BRIEF DESCRIPTION OF THE DRAWINGS

FIG. 1 is a cross-sectional view of an embodiment of an electromagnetic valve in accordance with the present invention; and FIG. 2 is an enlarged front view of a pressure responsive member used in the electromagnetic valve of FIG. 1.

DESCRIPTION OF THE PREFERRED EMBODIMENT

Referring now to FIGS. 1 and 2 of the drawing, there is shown a preferred embodiment of an electromagnetic valve in accordance with the present invention. While the principle of this invention is applicable to various electromagnetic valves, the explanation will be directed to an electromagnetic valve or fuel injector valve used in an internal combustion engine (not shown). The electromagnetic valve designated by the reference numeral 10 comprises a central magnetic pole member 12 which is provided with a fuel passage 14 through which fuel flows. The central magnetic pole member 12 is formed with an enlarged section 12a which is securely connected to an upper section of a casing 16 by crimping or bending the upper section of the casing on the enlarged section 12a of the central magnetic pole member 12. A lower section of the casing 16 is securely connected to a valve seat member 18 by being crimped or bent on an enlarged section (no numeral) of the valve seat member 18. The valve seat member 18 is formed with a fuel outlet or injection opening 20 through which fuel is injected to be supplied to the internal combustion engine. The valve seat member 18 is located opposite to and spaced apart from a tip portion 12b of the central magnetic pole member so as to define therebetween a valve chamber or fuel chamber 22 to which fuel is introduced from the fuel passage 14 formed in and along the longitudinal axis (not shown) of the central magnetic pole member 12.

A spherical magnetic valve member 24 is movably disposed within the valve chamber 22 between the tip portion 12b of the central magnetic pole member 12 and the valve seat member 18. The valve member 24 is seatable on a valve seat surface $S_1$ formed on the valve seat member 18. The valve seat surface $S_1$ is in the shape of a recess to securely receive the spherical magnetic valve member when the valve member 24 is biased to the valve seat surface $S_1$ as indicated in FIG. 1. The valve seat surface $S_1$ leads to the fuel outlet 20. The spherical valve member 24 is also seatable or contactable on a contacting surface $S_2$ formed at the tip portion 12b of the central magnetic pole member 12. The contacting surface $S_2$ is shaped with a recess so as to securely receive the spherical valve member 24.

The central magnetic pole member 12 is provided with a fuel introduction passage 26 connecting the fuel passage 14 to the fuel chamber 22. It will be understood that the longitudinal axis of the fuel passage 14 is aligned with that of the fuel outlet 20. An electromagnetic coil 28 is mounted on a bobbin 30 disposed between the central magnetic pole member 12 and the casing 16. With this construction, when electric current passes through the electromagnetic coil 28 via a lead line 28a, the coil 28 is energized so that magnetism is generated on the central magnetic pole member 12. Then, the spherical valve member 24 separates from the valve seat surface $S_1$ of the valve seat member 18 and is attracted onto the contacting surface $S_2$ of the central magnetic pole member 12. As a result, the fuel outlet is opened to inject therethrough fuel from the fuel chamber 22. On the other hand, when electric current supply to the electromagnetic coil 28 is interrupted, the spherical valve member 24 is automatically seated on the valve seat surface $S_1$ by the action of pressure of fuel supplied into the fuel chamber 22 so that the fuel outlet 26 is closed to stop the fuel injection therethrough.

The casing 16 is formed with an annular section 16a whose peripheral surface is located in the vicinity of and spaced apart from the spherical surface of the valve member 24 as seen from FIG. 1. The annular section 16a of the casing 16 functions to receive the lines of magnetic force left from the central magnetic pole member 12 and accordingly acts as a side magnetic pole, by which the attracting action of the spherical valve member 26 onto the magnetic pole member 12 is stably and smoothly carried out.

The fuel passage 14 in the central magnetic pole member 12 leads to a fuel inlet 32 through which fuel is supplied into the fuel passage 14 after passing through a filter 34. The reference numerals 36, 38 and 40 denote sealing rings, respectively, for preventing fuel leakage.

It is to be noted that the tip portion 12b of the central magnetic pole member 12 is formed with a cylindrical hollow or recess 42 whose longitudinal axis (not shown) is aligned with that of the central magnetic pole member 12. The hollow 42 is in communication with fuel chamber 22 through openings 44 so that the fuel pressures in the hollow 42 and the fuel chamber 22 become equal to each other. For the same purpose, the openings 44 may be replaced with radially extending grooves formed on the contacting surface $S_2$ of the central magnetic pole member 12 though not shown.

A pressure responsive member or element 46 is disposed within the hollow 42 as shown in FIG. 1. The pressure responsive member 46 is, for example, a bellows as clearly shown in FIG. 2. It will be understood that the bellows 46 located in the hollow 42 contracts in the axial direction by the action of the fuel pressure when ambient pressure or fuel pressure prevailing in the fuel chamber 22 is higher than a predetermined level, whereas it expands in the same direction when the same fuel pressure is lower than the predetermined level. The bellows 46 is provided with a base portion 48 which is secured to a ceiling or bottom surface 42a of the hollow 42. The bellows 46 is further provided with a contactable portion 50 which is located opposite to and contactable with the spherical surface of the valve member 24. The bellows 46 is made of a material which is corrosion-resistant and gasoline-resistant (sour gasoline-resistant), for example, a copper based metal (a metal containing copper as the main component), a rubber or a stainless steel. Additionally, the bellows 46 is gas-tight and filled with nitrogen gas or argon gas.

In the operation of the above-mentioned electromagnetic valve 10, when the fuel pressure prevailing in the fuel chamber 22 is above the predetermined level, the pressure sensitive member or bellows 46 contracts by the action of the fuel pressure and accordingly the contactable portion 50 of the bellows 46 is spaced from the surface of the spherical valve member 24 so that the movement of the valve member 24 is not affected by the bellows 46 at all. In this state, the valve member 24 moves upwardly in the drawing when electric current passes through the electromagnetic coil 28, so that the valve member 24 contacts the contacting surface $S_2$ of the central magnetic pole member 12. As a result, the valve member 24 separates from the valve seat surface $S_1$ of the valve seat member 18 to open the fuel outlet 20 so that fuel is injected through the fuel outlet 20. When the electric current supply to the coil 28 is interrupted, the valve member 24 is automatically biased onto the valve seat surface $S_1$ of the valve seat member 18 so that the fuel outlet is closed to stop the fuel injection through the fuel outlet 20. As mentioned above, under normal conditions, the electromagnetic valve 10 performs its operation with good response.

Now, if the fuel pressure prevailing in the fuel chamber 22 becomes lower than the predetermined level, for example, where fuel leakage occurs in a fuel pump or a fuel piping system not shown, a biasing force applied onto the valve member 24 is weakened with the assistance of residual magnetism at the central magnetic pole member 12. This effect of weakening the biasing force is further promoted by gravity when the electromagnetic valve 10 is disposed to be laid lateral. However, with this arrangement according to the present invention, under such accidental conditions, the bellows 46 expands in its axial direction due to the lowering in the fuel pressure in the fuel chamber 22. At this moment, the contacting portion 50 of the bellows 46 contacts the surface of the valve member 24, biasing the valve member 24 in the direction to close the fuel outlet 20 or downward in the drawing. As a result, the valve member 24 is biased onto the valve seat surface $S_1$ of the valve seat member 18. Hence, the fuel leakage through a clearance between the valve member 24 and the valve seat surface $S_1$ can be effectively prevented even if such accidental lowering of the fuel pressure occurs.

As is apparent from the foregoing, according to the present invention, a pressure responsive member such as a bellows is provided opposite to a valve member in an electromagnetic valve of the type wherein the valve member moves to perform closing action of the valve in response to the pressure differential between upstream and downstream sides of the valve member. As such, during normal conditions at which the abovementioned pressure differential is considerably large, the pressure sensitive member does not have any effect on the movement of the valve member and accordingly good valve operation is maintained. In the event in which the above-mentioned pressure differential becomes small so that the biasing force onto the valve member is lowered, the pressure responsive member expands to bias the valve member to close the fuel outlet, so that fuel leakage due to failed or incomplete valve seating on the valve seat can be effectively prevented. In this regard, a significant advantage in practice can be obtained if the above-mentioned arrangement according to the present invention is applied to an electromagnetic valve for fuel injection in an internal combustion engine. As such, precise control for valve operation becomes possible, improving freedom in the selection of the installation direction of the electromagnetic valve relative to the engine.

What is claimed is:

1. An electromagnetic valve for controlling fluid flow, comprising:

a magnetic spherical valve member;

a valve seat member defining a fluid outlet and having a valve seat surface ($S_1$) on which said spherical valve member is seatable to close said fluid outlet, said fluid outlet being closable by said valve member when fluid pressure prevailing upstream of said valve member is higher than the fluid pressure prevailing downstream of said valve member;

a central magnetic pole member having a valve contacting surface ($S_2$) on which said valve member is contactable, said magnetic pole member being located opposite to said valve seat member so that said valve member is disposed between the valve seat surface of said valve seat member and the contacting surface of said magnetic pole member, said magnetic pole member capable of attracting the spherical valve member to separate from the valve seat surface of said valve seat member so as to open said fluid outlet, said magnetic pole member being formed with a hollow at the valve contacting surface thereof; and an expandable pressure responsive member disposed in said hollow of said magnetic pole member, said pressure responsive member being able to expand to bias said valve member onto the valve seat surface of said valve seat member so as to close said fluid outlet when the fluid pressure prevailing upstream of said valve member is lower than a predetermined level.

2. An electromagnetic valve as claimed in claim 1, in which said expandable pressure responsive member includes a bellows which contracts at a fluid pressure higher than said predetermined level and expands at a fluid pressure lower than said predetermined level.

3. An electromagnetic valve as claimed in claim 2, in which said magnetic pole member is formed with a fuel passage through which fluid is supplied to a fuel chamber defined between said magnetic pole member and said valve seat member.

4. An electromagnetic valve as claimed in claim 3, in which a tip portion of said magnetic pole member is formed with a communication passage for communicating said hollow and said fuel chamber.

5. An electromagnetic valve as claimed in claim 4, further comprising a side magnetic pole member of the annular shape for receiving the lines of magnetic force left from the said central magnetic pole member, said side magnetic pole member being located in the vicinity of and spaced apart from the surface of said spherical valve member to surround said spherical valve member, said side magnetic pole member constituting a part of a casing of said electromagnetic valve.

* * * * *